US009237579B2

(12) United States Patent
Jung et al.

(10) Patent No.: US 9,237,579 B2
(45) Date of Patent: Jan. 12, 2016

(54) DATA TRANSMITTING METHOD USING POWER DETECTION, AND DEVICE THEREOF

(75) Inventors: Manyoung Jung, Anyang-si (KR);
Sangwook Lee, Anyang-si (KR);
Byounghoon Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 99 days.

(21) Appl. No.: 14/119,073

(22) PCT Filed: Feb. 8, 2012

(86) PCT No.: PCT/KR2012/000914
§ 371 (c)(1),
(2), (4) Date: Nov. 20, 2013

(87) PCT Pub. No.: WO2012/165751
PCT Pub. Date: Dec. 6, 2012

(65) Prior Publication Data
US 2014/0105153 A1 Apr. 17, 2014

Related U.S. Application Data

(60) Provisional application No. 61/492,817, filed on Jun. 3, 2011.

(51) Int. Cl.
*H04W 4/00* (2009.01)
*H04W 72/08* (2009.01)
(52) U.S. Cl.
CPC .................. *H04W 72/085* (2013.01)

(58) Field of Classification Search
None
See application file for complete search history.

(56) References Cited

U.S. PATENT DOCUMENTS

| 2001/0005378 A1* | 6/2001 | Lee ................................ 370/459 |
| 2010/0008217 A1* | 1/2010 | Ding et al. .................... 370/210 |
| 2011/0002322 A1 | 1/2011 | Kim et al. |

FOREIGN PATENT DOCUMENTS

| KR | 2001-0063602 A | 7/2001 |
| KR | 2002-0055216 A | 7/2002 |
| KR | 10-2004-0055554 A | 6/2004 |
| KR | 10-2010-0071095 A | 6/2010 |

* cited by examiner

*Primary Examiner* — Afshawn Towfighi
(74) *Attorney, Agent, or Firm* — Birch, Stewart, Kolasch & Birch, LLP

(57) ABSTRACT

The present invention relates to a data transmitting method using power detection of an adjacent channel. The method comprises detecting power for a selected channel; determining an occupancy state of the channel by comparing the detected power with a threshold power; detecting power for a channel adjacent to the channel if the channel is in an unoccupied state on the basis of the determined result; determining a state of the adjacent channel by comparing the detected power for the adjacent channel with the minimum threshold power and the maximum threshold power; and transmitting data by using the channel on the basis of the determined results.

10 Claims, 13 Drawing Sheets

DATA TRANSMITTING METHOD USING POWER DETECTION, AND DEVICE THEREOF

This application is the National Phase of PCT/KR2012/000914 filed on Feb. 8, 2012, which claims priority under 35 U.S.C. 119(e) to U.S. Provisional Application No. 61/492,817 filed on Jun. 3, 2011, all which are hereby expressly incorporated by reference into the present application.

TECHNICAL FIELD

The present specification relates to a method and apparatus for transmitting data using power detection.

BACKGROUND ART

Recently, in order to solve exhaustion of frequency resources due to explosive increase of data communication, a need for using an unlicensed bandwidth such as TV whitespace (hereinafter, referred to as TVWS) has been gradually increased. Therefore, various attempts have been made to introduce a high-speed wireless data communication system such as a wireless local area network (WLAN) in a TVWS.

In a general radio frequency (RF) configuration of a wireless communication system (WLAN system), dynamic range of an RF front end is increased in proportion to an overall reception bandwidth.

In case of a TVWS, the RF front end requires frequency bandwidth wider than that of an existing wireless communication system. That is, in case of wireless communication using a TVWS, a dynamic range of the RF front end needs to be greater than the dynamic range of an existing wireless communication system.

In addition, even when a TVWS is divided into a plurality of subbands in consideration of a wideband property, the divided subband may be wider than that of an existing wireless communication system. Accordingly, in this case, an increased dynamic range is required for wireless communication.

In general, the dynamic range of the RF element is restricted by various factors such as implementation costs, element properties and power consumption. Such restriction in dynamic range increases unnecessary radiation to an adjacent frequency channel upon transmission and decreases a signal-to-noise ratio (SNR) due to a mutual modulation phenomenon generated by a signal of an adjacent channel upon reception.

Due to such a phenomenon, if the dynamic range is not increased upon communication using a TVWS, reception performance may deteriorate by unnecessary radiation occurring due to transmission of an adjacent channel.

DISCLOSURE

Technical Problem

An object of the present invention devised to solve the problem lies in a method and apparatus for transmitting data using power detection for an occupied bandwidth and power detection considering power for an entire RF reception bandwidth in a wireless communication system.

Another object of the present invention devised to solve the problem lies in a method and apparatus for transmitting data using power detection capable of reducing unnecessary radiation to an adjacent frequency channel in a resource allocation scheme using power detection.

Technical Solution

The object of the present invention can be achieved by providing a method of transmitting data at a transmitter using power detection of an adjacent channel including detecting power of a selected channel, comparing the detected power with threshold power and determining an occupancy state of the channel, detecting power of the adjacent channel of the channel if it is determined that the channel is not occupied, comparing the detected power of the adjacent channel with minimum threshold power and maximum threshold power and determining the state of the adjacent channel, and transmitting the data using the channel based on the determined result.

The determining the occupancy state of the channel may include determining that the channel is not occupied if the detected power is less than the threshold power, and determining that the channel is occupied by another transceiver if the detected power is equal or greater than the threshold power.

The determining the occupancy state of the channel may include waiting for a predetermined time if it is determined that the channel is occupied, and re-detecting the power of the channel after the predetermined time has elapsed.

The determining the state of the adjacent channel may include determining that data is being received using the adjacent channel if the power of the adjacent channel is equal to or greater than the minimum threshold power and is equal to or less than the maximum threshold power, determining that data is being transmitted using the adjacent channel if the power of the adjacent channel is greater than the maximum threshold power, and determining that the adjacent channel is not occupied if the power of the adjacent channel is less than the minimum threshold power.

The transmitting the data may include waiting for a predetermined time if it is determined that data is being received using the adjacent channel and re-detecting the power of the channel after the predetermined time has elapsed.

The transmitting the data may include transmitting the data using the channel if data is being transmitted using the adjacent channel or if the adjacent channel is not occupied, as the result of comparison.

The channel and/or the adjacent channel may be a frequency bandwidth used in an LTE system.

In another aspect of the present invention, provided herein is a transmitter for transmitting data using power detection of an adjacent channel including a wireless communication unit for transmitting and receiving a radio frequency (RF) signal and a processor for controlling the wireless communication unit and transmitting data, wherein the processor detects power of a selected channel; compares the detected power with threshold power to determine an occupancy state of the channel, detects power of the adjacent channel of the channel if it is determined that the channel is not occupied, compares the detected power of the adjacent channel with minimum threshold power and maximum threshold power to determine the state of the adjacent channel and transmits data using the channel based on the determined result.

The processor may determine that the channel is not occupied if the detected power is less than the threshold power and determine that the channel is occupied by another transceiver if the detected power is equal or greater than the threshold power.

The processor may wait for a predetermined time if it is determined that the channel is occupied and re-detect the power of the channel after the predetermined time has elapsed.

The processor may determine that data is being received using the adjacent channel if the power of the adjacent channel is equal to or greater than the minimum threshold power and is equal to or less than the maximum threshold power, determine that data is being transmitted using the adjacent channel if the power of the adjacent channel is greater than the maximum threshold power, and determine that the adjacent channel is not occupied if the power of the adjacent channel is less than the minimum threshold power.

The processor may wait for a predetermined time if it is determined that data is being received using the adjacent channel and re-detect the power of the channel after the predetermined time has elapsed.

The processor may transmit the data using the channel if data is being transmitted using the adjacent channel or if the adjacent channel is not occupied, as the result of comparison.

The channel and/or the adjacent channel may be a frequency bandwidth used in an LTE system.

Advantageous Effects

According to the method and apparatus for transmitting data using power detection disclosed in the present specification, it is possible to reduce performance deterioration due to unnecessary radiation to an adjacent channel by considering power detection for an occupied bandwidth and power for an entire RF reception bandwidth in a wireless communication system.

According to the method and apparatus for transmitting data using power detection disclosed in the present specification, it is possible to reduce a retransmission rate due to transmission errors occurring by unnecessary radiation to an adjacent frequency channel and to efficiently utilize restricted resources.

BEST MODE

Figure 1:
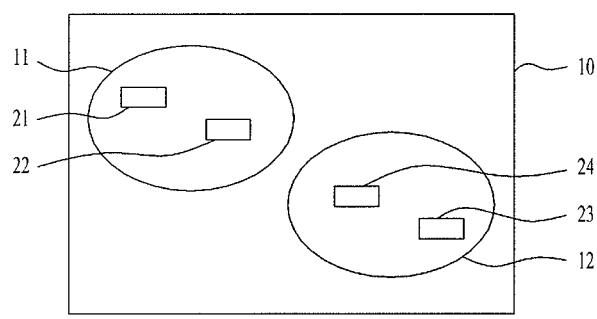
FIG. 1 is a block diagram showing a wireless communication system.

The following technologies can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied as wireless (or radio) technology such as UTRA (Universal Terrestrial Radio Access) or CDMA2000. TDMA may be embodied as wireless (or radio) technology such as GSM (Global System for Mobile communications)/GPRS (General Packet Radio Service)/EDGE (Enhanced Data Rates for GSM Evolution). OFDMA may be embodied as wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA).

UTRA is a part of the UMTS (Universal Mobile Telecommunications System). 3GPP (3rd Generation Partnership Project) LTE (long term evolution) is a part of the E-UMTS (Evolved UMTS), which uses E-UTRA. 3GPP LTE employs the OFDMA in downlink and employs the SC-FDMA in uplink. LTE-Advanced (LTE-A) is an evolved version of 3GPP LTE.

Technical terms used in the present specification are used merely to illustrate specific embodiments, and it should be understood that they are not intended to limit the present disclosure. So long as not defined otherwise, all terms used herein including technical terms may have the same meaning as those generally understood by an ordinary person skilled in the art to which the present disclosure belongs, and should not be construed in an excessively comprehensive manner or an extremely restricted manner. In addition, if a technical term used in the description of the present disclosure is an erroneous term that fails to clearly express the idea of the present disclosure, it should be replaced by a technical term that can be properly understood by those skilled in the art. In addition, general terms used in the description of the present disclosure should be construed according to definitions in dictionaries or according to the context, and should not be construed in an excessively restrained manner.

A singular representation may include a plural representation unless the context clearly indicates otherwise. It will be understood that the terms 'comprising', 'include', etc., when used in the present specification, specify the presence of several components or several steps and part of the components or steps may not be included or additional components or steps may further be included.

The term "unit" and the suffixes "-or/er" described in the specification are used interchangeably for ease of description of the specification and do not have different meanings or roles.

In describing the present invention, a detailed description of known functions and configurations will be omitted when it may obscure the subject matter of the present invention. The accompanying drawings are used to help easily understood the technical idea of the present invention and it should be understood that the idea of the present invention is not limited by the accompanying drawings.

Hereinafter, the embodiments disclosed in the present specification will be described in detail with reference to the accompanying drawings.

Wireless Communication System

FIG. 1 is a block diagram showing a wireless communication system.

Referring to FIG. 1, the wireless communication system 10 implemented by IEEE 802.11 includes one or more basic service sets (hereinafter, referred to as BSSs) 11 and 12 and one or more user equipments (UEs) (stations) 21 to 24.

The BSSs 11 and 12 have two UEs 21 to 24 as members, respectively. Ellipses shown in FIG. 1 indicate service areas (coverage) of the BSSs 11 and 12, in which the UEs 21 to 24 of the BSSs 11 and 12 may perform communication. The service area is also referred to as a basic service area (hereinafter, referred to as BSA). If any one of the UEs 21 to 24 moves out of the BSA, the UE may not directly perform communication with the other UEs 21 to 24 located in the BSA.

An independent BSS (hereinafter, referred to as an IBSS) is a most basic type of wireless communication system. At minimum, wireless communication is performed by two UEs. Since the BSSs 11 and 12 shown in FIG. 1 are simple and do not include other components, the BSSs 11 and 12 are representative examples of the IBSS. The IBSS operation mode is possible when the UEs 21 to 24 of the wireless communication system can directly perform communication. Since IBBS wireless communication is established without pre-planning when a LAN is required, the IBSS type is also referred to as an ad hoc network.

The configurations of the UEs 21 to 24 for the BSSs 11 and 12 are dynamically changed depending upon whether the UEs 21 to 24 are powered on or off or whether the UEs 21 to 24 move into or out of the area. The UEs 21 to 24 may participate in the BSSs 11 and 12 using a synchronization process in order to become members of the BSSs 11 and 12. The UEs 21 to 24 should be associated with the BSSs 11 and 12 in order to access all BSS based services. Such association is dynamic and includes use of a distributed system service (hereinafter, referred to as a DSS).

Figure 2:
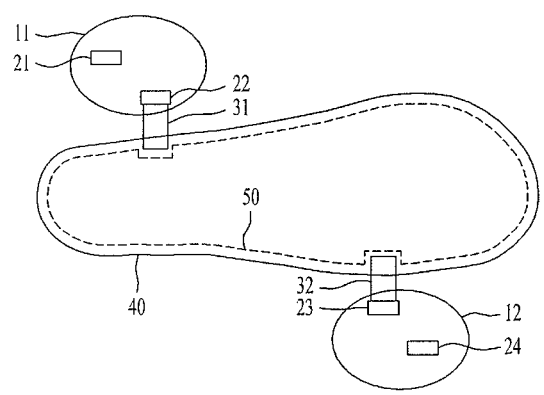
FIG. 2 is a block diagram showing an example of an extended wireless communication system.

FIG. 2 is a block diagram showing an example of an extended wireless communication system.

Referring to FIG. 2, the wireless communication system may include components of an extended network including a plurality of BSSs 11 and 12. In order to interconnect the plurality of BSSs 11 and 12, a distribution system (hereinafter, referred to as a DS) 40 is used.

The IEEE 802.11 standard logically separates a wireless medium (hereinafter, referred to as WM) from a distribution system medium (hereinafter, referred to as a DSM) 50. In the wireless communication system, various media may be the same or different.

The DS 40 handles an address for mapping to a destination or provides a logical service necessary to combine the plurality of BSSs 11 and 12, thereby supporting a mobile terminal.

Access points (hereinafter, referred to as APs) 31 and 32 function as UEs and may access the DS 40 via the WM for the associated UEs 22 and 24.

Data is moved between the BSSs 11 and 12 and the DS 30 via the AP. At this time, since the APs 31 and 32 may be associated with the UE, the APs may be the UEs. Accordingly, the addresses of the APs 31 and 32 may be specified. For communication between the WM and the DSM 50, the addresses used by the APs 31 and 32 need not be the same.

Data sent to the addresses of the UEs 22 and 24 associated with the APs 31 and 32 is always received at an uncontrolled port for processing by IEEE 802.1X port access entities.

Hereinafter, an extended service set (hereinafter, referred to as ESS) for a wide service area network will be described.

Figure 3:
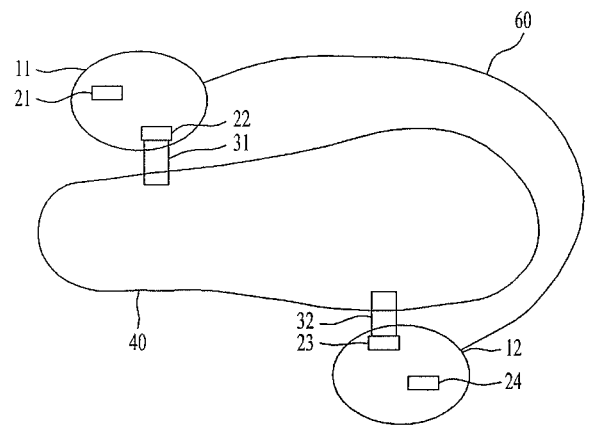
FIG. 3 is a block diagram showing an example of a wireless communication system indicating an extended service set.

FIG. 3 is a block diagram showing an example of a wireless communication system having an extended service set.

Referring to FIG. 3, the DS 40 and the BSSs 11 and 12 establish an IEEE 802.11 standard wireless network having an arbitrary size and complexity. The network shown in FIG. 3 is referred to as an ESS network in the IEEE 802.11 standard. The ESS means a combination of the BSSs 11 and 12 connected via the DS 40. Accordingly, the ESS does not include the DS 40. At this time, the ESS network 50 indicates the same logical link control (hereinafter, referred to as LLC) layer as the IBSS network. The UEs 21 to 24 in the ESS 50 may perform communication and the mobile terminals 21 to 24 may move from one BSS 11 or 12 to another BSS 11 or 12 (in the same ESS), that is, to another LLC layer.

The relative physical locations of the BBSs 11 and 12 shown in FIG. 3 are not defined in the IEEE 802.11 standard and may be defined as follows.

A) The BSSs 11 and 12 may partially overlap and, in this case, may be used to align consecutive service areas within a physical space.

B) The BSSs 11 and 12 may be physically disconnected. Logically, there is no limitation to a distance between the BSSs 11 and 12.

C) The BSSs 11 and 12 may be physically associated, thereby leading to unnecessary duplication.

D) One (or more) IBSS or ESS network may be physically located in the same space as one (or more) ESS network, for various reasons: for example, if an ad hoc network and an ESS network operate together, if physically operating wireless communication networks are established by different entities and if two or more different connection and security policies are necessary at the same location.

Figure 4:
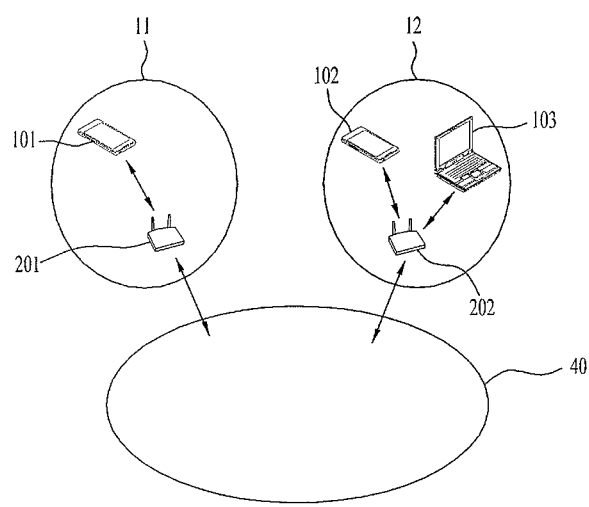
FIG. 4 is a block diagram showing a general structure of a wireless communication system.

FIG. 4 is a block diagram showing a general structure of a wireless communication system.

Referring to FIG. 4, an ESS 60 includes BSS 1 (11) and BSS 2 (12). In addition, each BSS includes wireless communication UEs 101 to 103 and wireless communication BSs 201 and 202.

The wireless communication UEs 101 to 103 may include various electronic apparatuses such as a mobile terminal, a telematics terminal, a smartphone, a portable terminal, a personal digital assistant (PDA), a portable multimedia player (PMP), a laptop, a tablet PC, a WiBro device, an Internet protocol television (IPTV), a television, a 3D television, an imaging device, a telematics device, a navigation device and an audio video navigation (AVN) device.

Hereinafter, the wireless communication UEs 101 to 103 may be referred to as stations, wireless transmit/receive units (WTRUs), user equipments (UEs), mobile stations (MSs), mobile terminals, mobile subscriber units, etc.

The wireless communication BSs 201 and 202 may be referred to as base stations (BSs), Node-Bs, eNode-Bs, base transceiver station (BTSs) or femto BSs.

Figure 5:
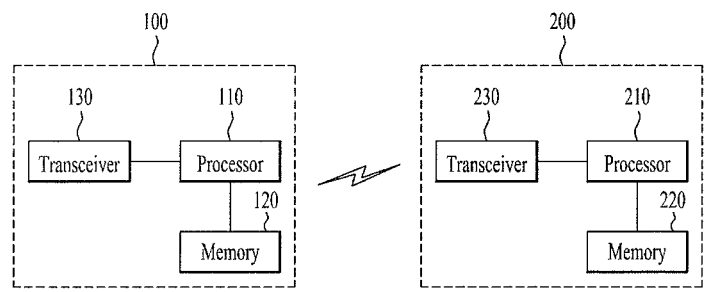
FIG. 5 is a block diagram showing a structure of a wireless communication base station and a wireless communication user equipment (UE).

FIG. 5 is a block diagram showing a structure of a wireless communication base station and a wireless communication user equipment (UE).

Referring to FIG. 5, the wireless communication UE 100 may include a processor 110, a memory 120 and a transceiver 130 and the wireless communication BS 200 may include a processor 210, a memory 220 and a transceiver 230.

The transceiver 130 and 230 transmit and receive a radio signal and implement an IEEE 802 physical layer. The processors 110 and 210 are respectively connected to the transceivers 130 and 230 in order to implement the IEEE 802 physical layer and/or a media access control (MAC) layer. The processors 110 and 210 may implement a channel scanning scheme.

The processors 110 and 210 and/or the transceivers 130 and 230 may include application specific integrated circuits (ASICs), other chipsets, logic circuits and/or data processors. The memories 120 and 220 may include read only memories (ROMs), random access memories (RAMs), flash memories, memory cards, storage media, and/or other storage devices. When the embodiment disclosed in the present specification is implemented by software, the above-described method may be implemented by the modules (processors, functions, etc.) for performing the above-described functions. The modules may be stored in the memories 120 and 220 and may be executed by the processors 110 and 210. The memories 120 and 220 may be included inside or outside the processors 110 and 210 and may be connected to the processors 110 and 210 via well-known means.

Among the above-described components, the structure of the processors 110 and 210 will be described in detail below.

Figure 6:
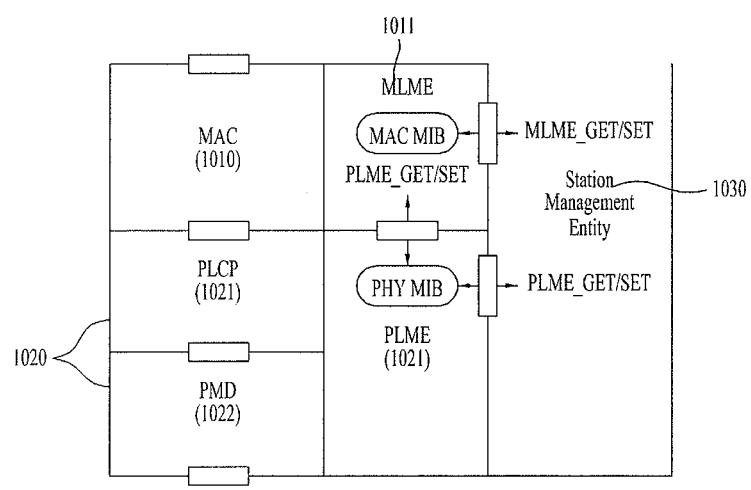
FIG. 6 is a block diagram showing processors of a wireless communication base station and a wireless communication UE.

FIG. 6 is a block diagram showing processors of a wireless communication BS and a wireless communication UE.

Referring to FIG. 6, the processors 110 and 210 may have various layered structures and, more particularly, have a data link layer (Hereinafter, referred to as a DLL), a MAC sublayer 1010 located thereon and a physical layer (hereinafter, referred to as PHY) layer 1020 located therebetween. As shown in FIG. 6, the PHY layer 1020 may include a physical layer convergence protocol (hereinafter, referred to as PLCP) entity 1021 and a physical medium dependent (hereinafter, referred to as PMD) entity 1022. The MAC sublayer 1010 and the PHY layer 1020 may include a MAC sublayer management entity (hereinafter, referred to as an MLME) 1011 and a physical layer management entity (hereinafter, referred to as a PLME) 1021, respectively. The MLME 1011 and the PLME 1021 provide layer management service interfaces via a layer capable of calling a management function.

In order to provide an accurate MAC operation, a station management entity (hereinafter, referred to as SME) 1030 is present in each UE. The SME 1030 is a layer independent entity which may be present at or beside a separated management layer. Although the function of the SME 1030 is not accurately specified in the present specification, the SME 1030 is responsible for collecting a layer dependence state from various layer management entities (LMEs) and setting a layer-specific variable. The SME 1030 should perform the functions of a general system management entity and implement a standard management protocol.

The entities shown in FIG. 6 interact using various methods. FIG. 6 shows several examples of GET/SET primitive exchange. The XX-GET.request primitive is used to request a value of a given MIBattribute (management information base attribute). The XX-GET.confirm primitive is used to return an appropriate MIB attribute value in case of state="success" and to otherwise indicate error in a state field. XX-SET.request primitive is used to request to set a specified MIB attribute value to a given value. If the MIB attribute value indicates a specific operation, the XX-SET.request primitive requests that the specific operation be performed. The XX-SET.confirm primitive is used to confirm that the MIB attribute value is set to the requested value in case of state="success" and to otherwise indicate error in a state field. If the MIB attribute value indicates a specific operation, XX-SET.confirm primitive confirms that the specific operation has been performed.

3GPP LTE System

Figure 7:
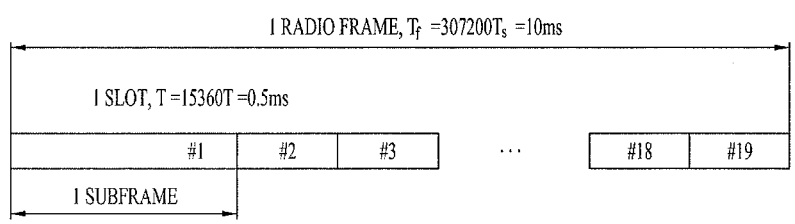
FIG. 7 is a diagram showing a structure of a radio frame used in a 3GPP LTE system as an example of a wireless communication system.

FIG. 7 is a diagram showing a structure of a radio frame used in a 3GPP LTE system as an example of a wireless communication system.

Referring to FIG. 7, one radio frame has a length of 10 ms (307200 Ts) and includes 10 subframes having the same size. Each subframe has a length of 1 ms and includes two slots. Each slot has a length of 0.5 ms (15360 Ts). Here, Ts denotes a sampling time and is expressed by $Ts=1/(15 \text{ kHz} \times 2048) = 3.1552 \times 10^{-8}$ (about 33 ns). The slot includes a plurality of OFDM symbols or SC-FDMA symbols in a time domain and includes a plurality of resource blocks (RBs) in a frequency region.

In the LTE system, one RB includes 12 subcarriers×7(6) orthogonal frequency division multiplexing (OFDM) or single carrier-frequency division multiple access (SC-FDMA) symbols. A Transmission Time Interval (TTI) which is a unit time for transmission of data may be determined in units of one or more subframes. The structure of the radio frame is only exemplary. Accordingly, the number of subframes included in the radio frame, the number of slots included in the subframe or the number of OFDM symbols or SC-FDMA symbols included in the slot may be changed in various manners.

Figure 8:
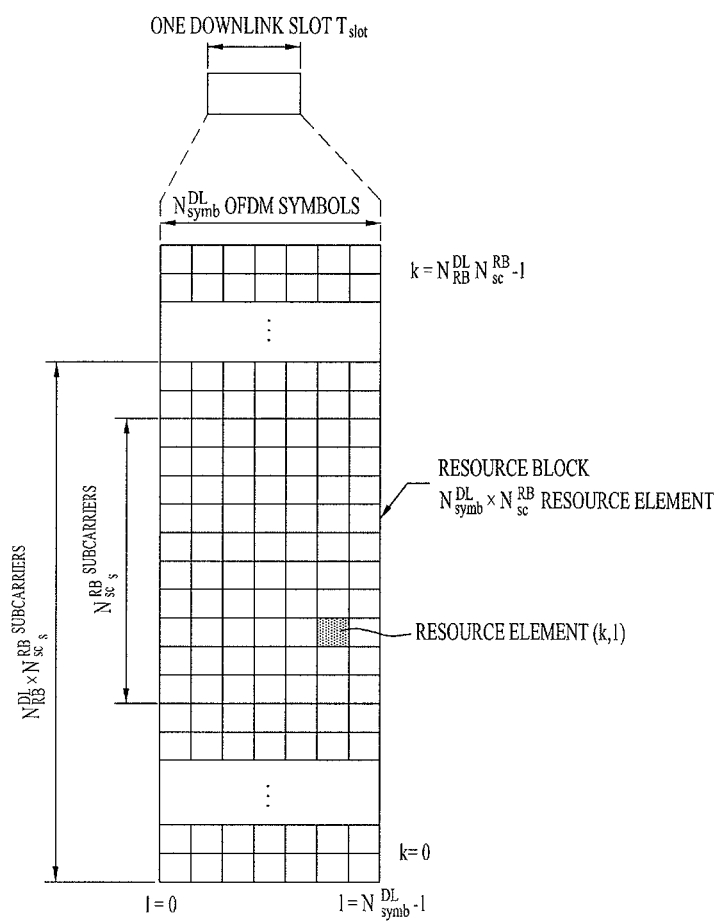
FIG. 8 is a diagram showing a time-frequency resource grid structure of downlink used in a 3GPP LTE system as an example of a wireless communication system.

FIG. 8 is a diagram showing a time-frequency resource grid structure of a downlink used in a 3GPP LTE system as an example of a wireless communication system.

A downlink signal transmitted in each slot may be used as a resource grid structure including $N_{RB}^{DL} \times N_{SC}^{RB}$ subcarriers and $N_{symb}^{DL}$ orthogonal frequency division multiplexing (OFDM) symbols. Here, $N_{RB}^{DL}$ denotes the number of resource blocks (RBs) in downlink, $N_{SC}^{RB}$ denotes the number of subcarriers configuring one RB, and $N_{symb}^{DL}$ denotes the number of OFDM symbols in one downlink slot. $N_{RB}^{DL}$ is changed according to a downlink transmission bandwidth configured within a cell and should satisfy $N_{RB}^{min,DL} \leq N_{RB}^{DL} \leq N_{RB}^{max,DL}$. Here, $N_{RB}^{min,DL}$ denotes a minimum downlink bandwidth supported by a wireless communication system and $N_{RB}^{max,RB}$ denotes a maximum downlink bandwidth supported by a wireless communication system. Although $N_{RB}^{min,DL}=6$ and $N_{RB}^{max,RB}=110$, the present invention is not limited thereto. The number of OFDM symbols included in one slot may be changed according to a cyclic prefix (CP) length and a subcarrier gap. In case of multi-antenna transmission, one resource grid may be defined per antenna port.

Each element in the resource grid for each antenna port is referred to as a resource element (RE) and is uniquely identified by an index pair (k, l) in a slot. Here, k denotes an index of a frequency domain, l denotes an index of a time domain, k has any one value of $0, \ldots,$ and $N_{RB}^{DL}N_{SC}^{RB}-1$ and l has any one value of $0, \ldots,$ and $N_{symb}^{DL}-1$.

Resource blocks (RBs) shown in FIG. 8 are used to describe a mapping relationship between physical channels and REs. The RB may be divided into a physical resource block (PRB) and a virtual resource block (VRB). One PRB is defined by $N_{symb}^{DL}$ consecutive OFDM symbols of the time domain and $N_{SC}^{RB}$ consecutive subcarriers of the frequency domain. Here, $N_{symb}^{DL}$ and $N_{SC}^{RB}$ may be predetermined values. For example, $N_{symb}^{DL}$ and $N_{SC}^{RB}$ may be given as shown in Table 1. Accordingly, one PRB includes $N_{symb}^{DL} \times N_{SC}^{RB}$ REs. One PRB corresponds to one slot in the time domain and corresponds to 180 kHz in the frequency domain, but the present invention is not limited thereto.

TABLE 1

| Configuration | | $N_{SC}^{RB}$ | $N_{symb}^{DL}$ |
|---|---|---|---|
| Normal cyclic prefix | $\Delta f = 15$ kHz | 12 | 7 |
| Extended cyclic prefix | $\Delta f = 15$ kHz | 24 | 6 |
| | $\Delta f = 7.5$ kHz | | 3 |

The PRB has a value ranging from 0 to $N_{RB}^{DL}-1$ in the frequency domain. A relationship between a PRB number $n_{PRB}$ in the frequency domain and an RE (k, l) within one slot satisfies $$n_{PRB} = \left\lfloor \frac{k}{N_{sc}^{RB}} \right\rfloor.$$

The size of the VRB is equal to that of the PRB. The VRB may be divided into a localized VRB (LVRB) and a distributed VRB (DVRB). With respect to the respective types of VRBs, a pair of VRBs located in two slots of one subframe is allocated a single VRB number $n_{VRB}$.

The VRB may have the same size as the PRB. Two types of VRBs are defined: a first type is a localized VRB (LVRB) and a second type is a distributed VRB (DVRB). With respect to the respective types of VRBs, a pair of VRBs is allocated over two slots of one subframe with a single VRB index (which, hereinafter, may be referred to as a VRB number). In other words, $N_{RB}^{DL}$ VRBs belonging to a first slot between two slots configuring one subframe are allocated any one of indexes from 0 to $N_{RB}^{DL}-1$ and $N_{RB}^{DL}$ VRBs belonging to a second slot between the two slots are similarly allocated any one of indexes from 0 to $N_{RB}^{DL}-1$.

Figure 9A:
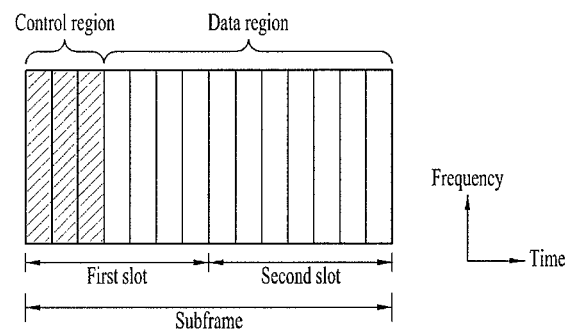
FIG. 9a is a diagram showing a structure of a downlink subframe used in a 3GPP LTE system as an example of a wireless communication system.

FIG. 9a is a diagram showing a structure of a downlink subframe used in a 3GPP LTE system as an example of a wireless communication system.

Referring to FIG. 9a, one downlink subframe includes two slots in a time domain. A maximum of three OFDM symbols located in a front portion of a first slot within the downlink subframe corresponds to a control region to which control channels are assigned, and the remaining OFDM symbols correspond to a data region to which a physical downlink shared channel (PDSCH) is allocated.

Examples of downlink control channels used in the 3GPP LTE system include a physical control format indicator channel (PCFICH), a physical downlink control channel (PDCCH), a physical hybrid ARQ indicator channel (PHICH), etc. The PCFICH transmitted at a first OFDM symbol of a subframe carries information regarding the number of OFDM symbols (that is, the size of the control region) used for transmission of control channels within the subframe. Control information transmitted through the PDCCH is referred to as downlink control information (DCI). DCI indicates uplink resource assignment information, downlink resource assignment information, an uplink transmit (Tx) power control command for arbitrary UE groups, etc. The PHICH carries an acknowledgement (ACK)/negative-acknowledgement (NACK) signal for uplink hybrid automatic repeat request (HARQ). That is, an ACK/NACK signal for uplink data transmitted by a UE is transmitted on a PHICH.

A PDCCH which is a downlink physical channel will now be described.

A BS may transmit resource allocation and transport format of a physical downlink shared channel (PDSCH) (which is called DL grant), resource allocation information of a PUSCH (which is called UL grant), a set of Tx power control commands for an arbitrary UE or individual UEs within an arbitrary UE group, activation of a voice over IP (VoIP) service, etc. through a PDCCH. A plurality of PDCCHs may be transmitted in a control region. A UE may monitor a plurality of PDCCHs. The PDCCH is composed of an aggregate of one or several consecutive control channel elements (CCEs).

A PDCCH composed of one or several CCEs may be transmitted in a control region after being subjected to sub-block interleaving. The CCE is a logical allocation unit used to provide a PDCCH with a coding rate based on a radio channel state. The CCE corresponds to a plurality of resource element groups. A format of the PDCCH and the number of bits of the available PDCCH are determined according to a correlation between the number of CCEs and the coding rate provided by the CCEs.

Control information transmitted through a PDCCH is referred to as downlink control information (DCI). Table 2 shows DCI according to a DCI format.

TABLE 2

| DCI format | Description |
|---|---|
| DCI format 0 | used for scheduling of PUSCH |
| DCI format 1 | used for scheduling of one PDSCH codeword |
| DCI format 1A | used for compact scheduling of one PDSCH codeword and random access procedure |
| DCI format 1B | used for compact scheduling of one PDSCH codeword with precoding information |
| DCI format 1C | used for very compact scheduling of one PDSCH codeword |
| DCI format 1D | used for compact scheduling of one PDSCH codeword with precoding and power offset information |
| DCI format 2 | used for scheduling PDSCH to UEs configured in closed-loop spatial multiplexing mode |
| DCI format 2A | used for scheduling PDSCH to UEs configured in open-loop spatial multiplexing mode |
| DCI format 3 | used for transmission of TPC commands for PUCCH and PUSCH with 2-bit adjustments |
| DCI format 3A | used for transmission of TPC commands for PUCCH and PUSCH with single bit power adjustments |

DCI format 0 indicates uplink resource allocation information, DCI formats 1 to 2 indicate downlink resource allocation information, and DCI formats 3 and 3A indicate uplink transmit power control (TPC) commands for arbitrary UE groups.

A method of mapping resources for PDCCH transmission at a BS in an LTE system will be briefly described.

In general, the BS may transmit scheduling allocation information and other control information through a PDCCH. A physical control channel may be transmitted on an aggregate of one or a plurality of CCEs. One CCE includes nine resource element groups (REGs). The number of REGs which are not allocated to a physical control format indicator channel (PCFICH) or a physical automatic repeat request indicator channel (PHICH) is $N_{REG}$. CCEs which can be used in a system are 0 to $N_{CCE}-1$ (here, $N_{CCE}=\lfloor N_{REG}/9 \rfloor$). The PDCCH supports multiple formats as shown in Table 3. One PDCCH composed of n consecutive CCEs starts from a CCE for performing i mode n=0 (here, i denotes a CCE number). Multiple PDCCHs may be transmitted via one subframe.

TABLE 3

| PDCCH Format | Number of CCEs | Number of resource element groups | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

Referring to Table 3, the BS may determine a PDCCH format depending upon to how many regions control information is transmitted. In addition, the UE reads control information, etc. in CCE units, thereby reducing overhead. Similarly, a relay may read control information, etc. in R-CCE units. In an LTE-A system, resource elements (REs) may be mapped in units of relay-control channel elements (R-CCEs), in order to transmit an R-PDCCH to an arbitrary relay.

Figure 9B:
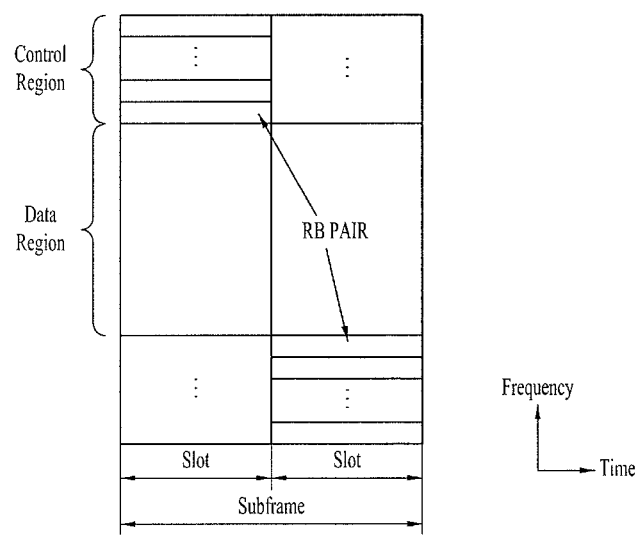
FIG. 9b is a diagram showing a structure of an uplink subframe used in a 3GPP LTE system as an example of a wireless communication system.

Referring to FIG. 9b, an uplink subframe may be divided into a control region and a data region in a frequency domain. The control region is allocated to a Physical Uplink Control Channel (PUCCH) carrying uplink control information. The data region is allocated to a Physical uplink Shared Channel (PUSCH) carrying user data. In order to maintain single carrier characteristics, one UE does not simultaneously transmit the PUCCH and the PUSCH. The PUCCH for one UE is allocated to an RB pair in one subframe. RBs belonging to the RB pair occupy different subcarriers at two slots. Thus, the RB pair allocated to the PUCCH is "frequency-hopped" at a slot boundary.

Figure 10:
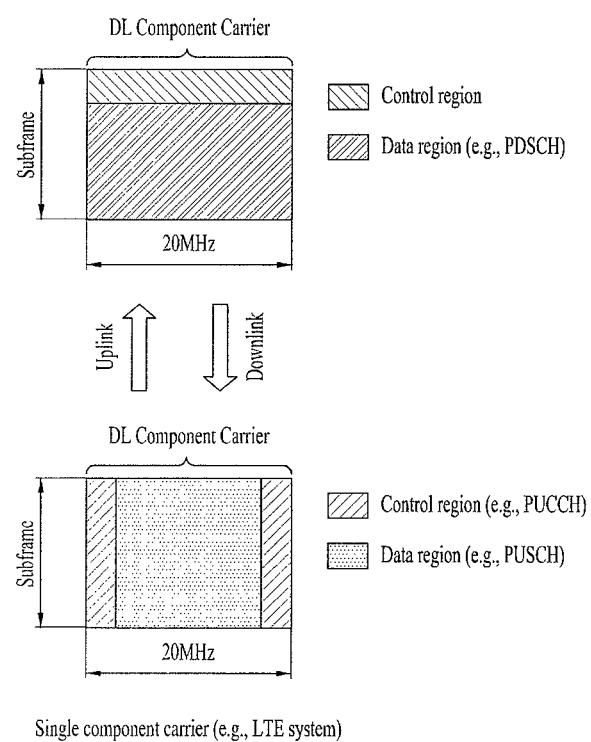
FIG. 10 is a diagram showing an example of performing single carrier communication in a 3GPP LTE system as an example of a wireless communication system.

FIG. 10 is a diagram showing an example of performing single carrier communication in a 3GPP LTE system as an example of a wireless communication system.

Referring to FIG. 10, a general FDD wireless communication system performs data transmission and reception via one downlink band and one uplink band corresponding thereto. A BS and a UE transmit and receive data and/or control information scheduled in subframe units. The data is transmitted and received via a data region configured in an uplink/downlink subframe and the control information is transmitted and received via a control region configured in an uplink/downlink subframe. The uplink/downlink subframe carries a signal via various physical channels. Although FIG. 10 focuses upon the FDD scheme for convenience, the above description is applicable to a TDD scheme by dividing a radio frame into uplink/downlink in a time domain.

Figure 11:
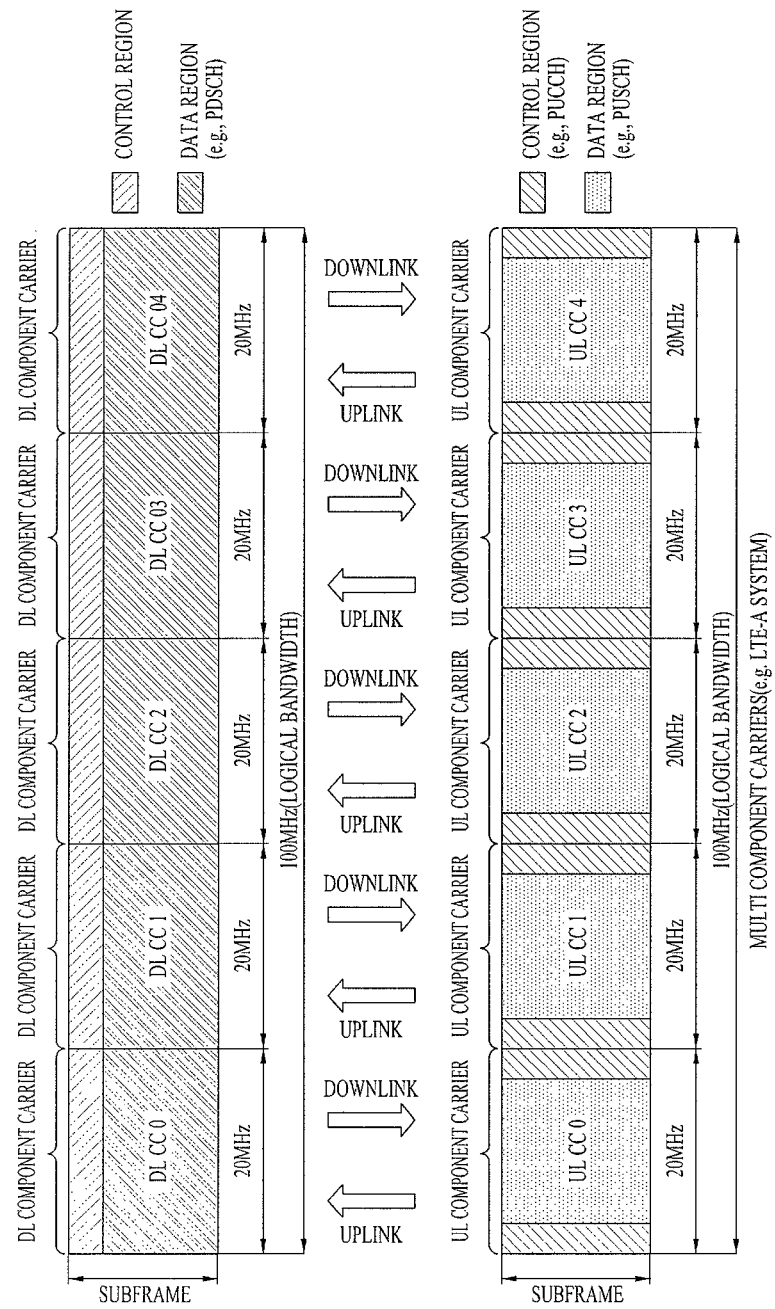
FIG. 11 is a diagram showing an example of performing multi-carrier communication in a 3GPP LTE system as an example of a wireless communication system.

FIG. 11 is a diagram showing an example of performing multi-carrier communication in a 3GPP LTE system as an example of a wireless communication system.

In an LTE-A system, in order to use a wider frequency bandwidth, carrier aggregation or bandwidth aggregation technology for utilizing an uplink/downlink bandwidth greater than a plurality of uplink/downlink frequency blocks is used. A multi-carrier system or a carrier aggregation (CA) system refers to a system for aggregating and utilizing a plurality of carriers having a bandwidth smaller than a target bandwidth, for wideband support. When a plurality of carriers having a bandwidth smaller than a target bandwidth is aggregated, the bandwidth of the aggregated carriers may be restricted to a bandwidth used in the existing system, for backward compatibility with the existing IMT system. For example, the existing 3GPP LTE system may support bandwidths of 1.4, 3, 5, 10, 15 and 20 MHz and an LTE-Advanced (LTE-A) system evolved from the LTE system may support a bandwidth greater than 20 MHz using only the bandwidths supported by the LTE system. Alternatively, CA may be supported by defining a new bandwidth, regardless of the bandwidths used in the existing system. Multi-carrier is used interchangeably with the terms "carrier aggregation" and "bandwidth aggregation". In addition, CA includes contiguous CA and non-contiguous CA.

For example, referring to FIG. 11, five 20-MHz CCs may be collected to support a bandwidth of 100 MHz in uplink/downlink. The CCs may be contiguous or non-contiguous in the frequency domain. FIG. 11 shows the case where the bandwidth of an uplink CC and the bandwidth of a downlink CC are equal and symmetrical, for convenience. However, the bandwidths of the CCs may be independently set. For example, the bandwidth of the uplink CC may be 5 MHz (UL CC0)+20 MHz (UL CC1)+20 MHz (UL CC2)+20 MHz (UL CC3)+5 MHz (UL CC4). In addition, asymmetrical carrier aggregation in which the number of uplink CCs and the number of downlink CCs are different is possible. Asymmetrical carrier aggregation may be generated due to a limitation of an available frequency bandwidth or may be artificially generated by network configuration. For example, even when the BS manages X DL CCs, a frequency bandwidth with which a specific UE performs reception may be restricted to Y ($\leq$X) DL CCs. In this case, the UE monitors DL signals/data transmitted via the Y CCs. In addition, even when the BS manages L UL CCs, a frequency bandwidth with which a specific UE performs transmission may be restricted to M ($\leq$L) DL CCs. The DL CCs or UL CCs restricted to the specific UE are referred to as serving UL or DL CCs configured in the specific UE. The BS may activate all or some of the CCs managed by the BS or deactivate some CCs so as to allocate a predetermined number of CCs to the UE. The BS may change the activated/deactivated CCs and the number of activated/deactivated CCs may be changed. The BS may configure Z DL CCs ($1 \leq Z \leq Y \leq X$), which should be preferentially monitored/received by the UE, as main DL CCs in a cell-specific or UE-specific manner. In addition, the BS may configure N DL CCs ($1 \leq N \leq M \leq L$), which should be preferentially transmitted by the UE, as main DL CCs in a cell-specific or UE-specific manner. The main DL or UL CCs restricted to the specific UE are referred to as serving UL or DL CCs configured in the specific UE. Various parameters for CA may be configured in a cell-specific, UE group-specific or UE-specific manner.

Once the BS allocates available CCs to the UE in a cell-specific or UE-specific manner, at least one of the allocated CCs is not deactivated unless allocation of the CCs to the UE is reconfigured or the UE performs handover. Hereinafter, a CC which is not deactivated unless CC allocation to the UE is reconfigured is referred to as a primary CC (PCC) and a CC which may be freely activated/deactivated by the BS is referred to as a secondary CC (SCC). Single carrier communication uses one PCC for communication between the BS and the UE and does not use an SCC for communication. The PCC and the SCC may be differentiated based on control information. For example, specific control information may be set to be transmitted and received only via a specific CC, such a specific CC is referred to as a PCC and the remaining CC(s) are referred to as SCC(s). For example, control information transmitted via a PUCCH may correspond to such specific control information. If control information transmitted on a PUCCH may be transmitted from the UE to the BS only via the PCC, a UL CC in which the PUCCH of the UE is present may be referred to as a UL PCC and the remaining UL CC(s) may be referred to as UL SCC(s). As another example, if a UE-specific CC is used, the specific UE may receive a DL synchronization signal (SS) from the BS as the specific control information. In this case, DL CC(s) used for the specific UE to receive the DL SS and to perform initial DL time synchronization (that is, DL CC(s) used to attempt access to the network of the BS) may be referred to as DL PCC(s) and the remaining CC(s) may be referred to as SCC(s). In case of a communication system according to LTE-A release-10, multi-carrier communication uses one PCC or 0 or 1 or more SCC(s) per UE for communication. However, this is defined based on the LTE-A standard. In the future, a plurality of PCCs per UE may be used for communication. The PCC may be referred to as a primary CC, an anchor CC or a primary carrier and the SCC may be referred to as a secondary cell or a secondary carrier.

LTE-A uses the concept of a cell in order to manage radio resources. The cell is defined as a combination of downlink resources and uplink resources, that is, a combination of DL CCs and UL CCs, and the uplink resources are not mandatory. However, this is defined based on the current LTE-A standard and the cell will be composed of uplink resources alone. Accordingly, the cell may be composed of downlink resources alone or both downlink resources and uplink resources. If CA is supported, linkage between the carrier frequency of downlink resources (or DL CCs) and the carrier frequency of uplink resources (or UL CCs) may be indicated by system information. For example, by system information block type 2 (SIB2) linkage, a combination of DL resources and UL resources may be indicated. Here, the carrier frequency refers to a center frequency of each cell or CC. A cell operating on a primary frequency (or PCC) may be referred to as a primary cell (PCell) and cell(s) operating on a secondary frequency (or SCC) may be referred to as secondary cells (SCells). The primary frequency (or PCC) refers to a frequency (CC) used for a UE to perform an initial connection establishment process or a connection re-establishment process. The PCell may indicate a cell indicated in a handover process. The secondary frequency (or SCC) may be configured after RRC connection establishment and refer to a frequency (or CC) used to provide additional radio resources. The PCell and the SCell may be collectively referred to as a serving cell. Accordingly, in case of a UE which is in an RRC_connected state but does not set carrier aggregation or supports carrier aggregation, only one serving cell composed of a PCell exists. In contrast, in case of a UE which is in an RRC_CONNECTED state and sets carrier aggregation, one or more serving cells exist. The serving cell includes a PCell and one or more SCells. In the future, the serving cell may include a plurality of PCells. For CA, a network may configure one or more SCells in addition to a PCell initially configured in a connection establishment process, for a UE supporting CA, after an initial security activation process starts. However, even when the UE supports CA, the network may configure only the PCell for the UE without adding the SCell. The PCell may be referred to as a primary cell, an anchor cell or a primary carrier and the SCell may be referred to as a secondary cell or a secondary carrier.

In a multi-carrier system, the BS may transmit a plurality of data units to the UE on given cell(s) (or CC(s)) and the UE may transmit ACK/NACK for the plurality of data units in one subframe. The UE may be allocated one or a plurality of cells (or DL CCs) for receiving a PDSCH for downlink data reception. The cell(s) (or DL CC(s)) for the UE may be semi-statically configured or reconfigured via RRC signaling. The cell(s) (or DL CC(s)) for the UE may be dynamically activated/deactivated via L1/L2 (MAC) control signaling. Therefore, a maximum number of ACK/NACK bits to be transmitted by the UE is changed according to available cells (or DL CCs) of the UE. That is, the maximum number of ACK/NACK bits to be transmitted by the UE is changed according to DL CC(s) (or configured serving cell(s)) configured/reconfigured via RRC signaling or activated via L1/L2 signaling.

Figure 12:
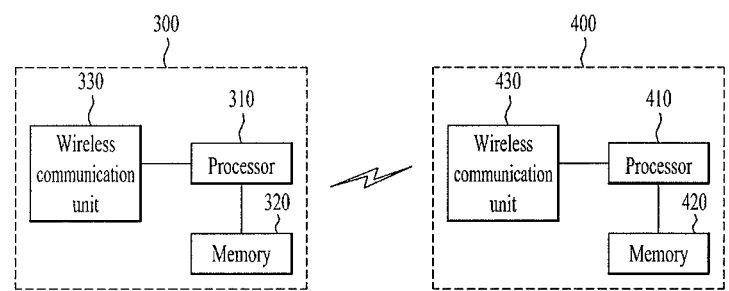
FIG. 12 is a block diagram showing a structure of a 3GPP LTE base station and UE.

FIG. 12 is a block diagram showing a structure of a 3GPP LTE BS and UE.

Referring to FIG. 12, the LTE system includes an LTE UE 300 and an LTE BS 400.

In downlink, a transmitter may be the LTE BS 400 and a receiver may be the LTE UE 300. In uplink, a transmitter may be the LTE UE 300 and a receiver may be the LTE BS 400.

The LTE UE 300 may include a processor 310, a memory 320 and a wireless communication unit 330.

The processor 310 may be configured to implement the procedure and/or method disclosed in the present specification.

The memory 320 is connected to the processor 310 to store a variety of information to operate the processor 310.

The wireless communication unit 330 is connected to the processor 310 to transmit and/or receive RF signals.

The LTE BS 400 may include a processor 410, a memory 420 and a wireless communication unit 430.

The processor 410 may be configured to implement the procedure and/or method disclosed in the present specification.

The memory 420 is connected to the processor 410 to store a variety of information to operate the processor 420.

The wireless communication unit 430 is connected to the processor 410 to transmit and/or receive RF signals.

The LTE UE 300 and/or the LTE BS 400 may include a single antenna and/or multiple antennas. If at least one of the LTE UE 300 and the LTE BS 400 has multiple antennas, the wireless communication system may be a multiple input multiple output (MIMO) system.

Hereinafter, embodiments for transmitting data using power detection in a wireless communication system according to the embodiment of the present specification will be described with reference to the drawings.

Data Transmission Using Power Detection

Figure 13:
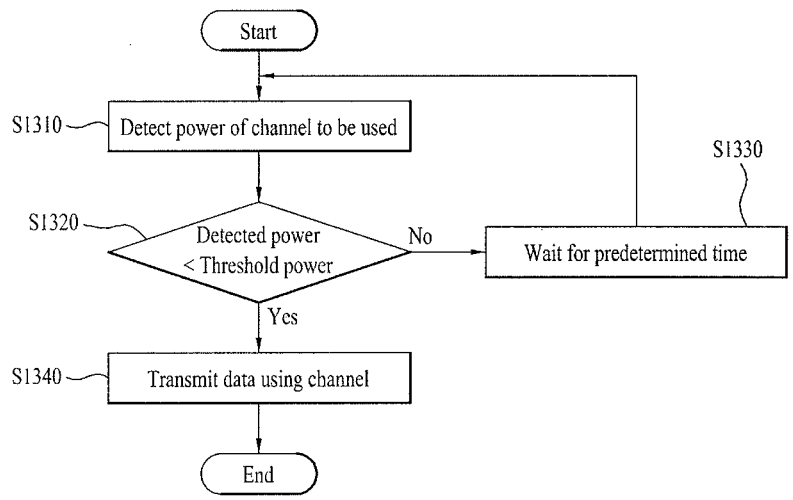
FIG. 13 is a flowchart illustrating a method of transmitting data using power detection of a wireless communication system.

FIG. 13 is a flowchart illustrating a method of transmitting data using power detection of a wireless communication system.

Referring to FIG. 13, a transmitter detects power of a channel to be used (S1310).

The transmitter may detect power of a channel to be used to transmit data to a receiver. The transmitter may detect power of the channel to be used and may include a power detection circuit such as an RF power measurer or a modulation analyzer.

The transmitter may be one of a BS, an access point (AP) or a UE capable of performing data transmission and reception in a wireless communication system. The channel may be an arbitrary channel belonging to a frequency bandwidth used by the transmitter.

Next, the transmitter compares the detected power with threshold power (S1320).

The transmitter may compare the detected power of the channel with the threshold power and determine whether the channel is occupied by another transmitter.

When the transmitter transmits data to the receiver using an arbitrary channel, since the data is converted into an electrical signal and then transmitted, the channel has power having an arbitrary level due to the electrical signal. In general, the channel may have power generated by an electrical signal generated due to noise, etc. However, the electrical signal generated due to noise is very weak and thus power generated thereby has a small value. Accordingly, if the channel is used for normal data transmission and reception, the power has a value equal to or greater than a predetermined level.

Threshold power is a criterion for determining whether the channel is used for data transmission, not for noise, is predetermined and may be stored in a memory of the transmitter. At this time, the threshold power may have an arbitrary value which is flexibly adjusted in consideration of noise of a communication environment.

A communication scheme in which a channel is occupied by one transmitter to perform data transmission and reception is referred to as a carrier sense multiple access with collision avoidance (CSMA/CA) scheme.

Since the IEEE 802.11 series employ CSMA/CA, the transmitter connected to the wireless communication system according to the standard needs to determine the occupancy state of the channel. That is, the transmitter may compare the detected power with the threshold power and determine whether the channel is occupied.

As a result of comparison, if the detected power is equal to or greater than the threshold power, the transmitter waits for a predetermined time (S1330).

The transmitter may determine that the communication channel is occupied by another transmitter if the detected power is equal to or greater than the threshold power.

If an arbitrary channel is occupied by one transmitter in the CSMA/CA method, another transmitter may not transmit data via the channel. Accordingly, the transmitter may resume power detection after waiting for a predetermined time (back-off time).

The transmitter may output a "BUSY" signal via a predetermined signal generator such that the components of the transmitter operate according to occupancy of the channel.

If the detected power is less than the threshold power, the transmitter transmits data using the channel (S1340).

The transmitter may determine that the communication channel is not occupied by another transmitter if the detected power is less than the threshold power. That is, the transmitter may determine that the channel may be occupied by the transmitter, because the channel is empty.

Accordingly, the transmitter may occupy the channel and transmit the data to the receiver via the channel.

The transmitter may output a "BUSY" signal via a predetermined signal generator such that the components of the transmitter occupy the channel and operate according to occupancy of the channel.

Unnecessary Radiation to Adjacent Channel

FIG. 14 is a diagram showing an interference phenomenon due to unnecessary radiation to an adjacent channel in data transmission using power detection of a wireless communication system.

Figure 14A:
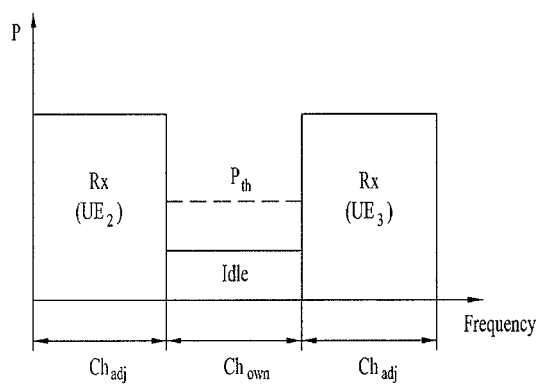
FIG. 14a is a diagram showing an interference phenomenon due to unnecessary radiation to an adjacent channel in data transmission using power detection of a wireless communication system.

Referring to FIG. 14a, as described above, a transmitter (UE) may detect power of a channel $Ch_{own}$ to be used and determine that the channel $Ch_{own}$ is unoccupied (idle) if the detected power of the channel is less than threshold power $P_{th}$. Accordingly, the transmitter (UE) may transmit data using the channel $Ch_{own}$.

However, even when the channel $Ch_{own}$ is in the idle state, as shown in FIG. 14a, an adjacent channel $Ch_{adj}$ of the channel $Ch_{own}$ may be used for data reception (Rx) of other UEs UE2 and UE3. That is, the other UEs UE2 and UE3 may receive data using the adjacent channel $Ch_{adj}$ of the channel $Ch_{own}$.

Figure 14B:
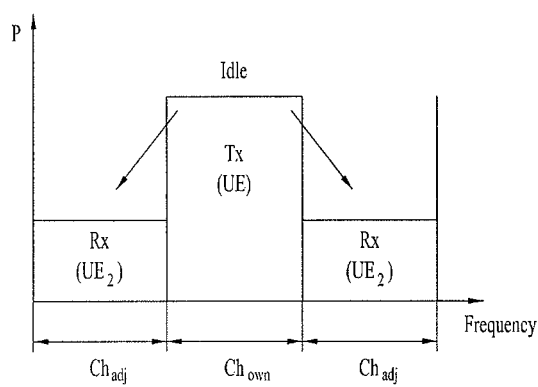
FIG. 14b is a diagram showing an interference phenomenon due to unnecessary radiation to an adjacent channel in data transmission using power detection of a wireless communication system.

In this case, if the transmitter (UE) determines that the channel $Ch_{own}$ is unoccupied (idle) and transmits the data using the channel, due to data transmission which generates power greater than that of data reception, as shown in FIG. 14b, the power of the channel $Ch_{own}$ is significantly higher than the power of the adjacent channel $Ch_{adj}$.

This leads to unnecessary radiation to the adjacent channel $Ch_{adj}$ by the channel $Ch_{own}$ and causes interference in data transmission. The other UEs UE2 and UE3 using the adjacent channel $Ch_{adj}$ request retransmission due to transmission errors and thus the transmission rate of the channel $Ch_{own}$ is decreased.

Accordingly, unnecessary radiation to an adjacent channel deteriorates reception performance and decreases a signal-to-noise ratio (SNR). These problems should be solved in the wireless communication system.

First Embodiment

In a first embodiment disclosed in the present specification, a method for transmitting data using power detection of an adjacent channel at a transmitter will be described.

Figure 15:
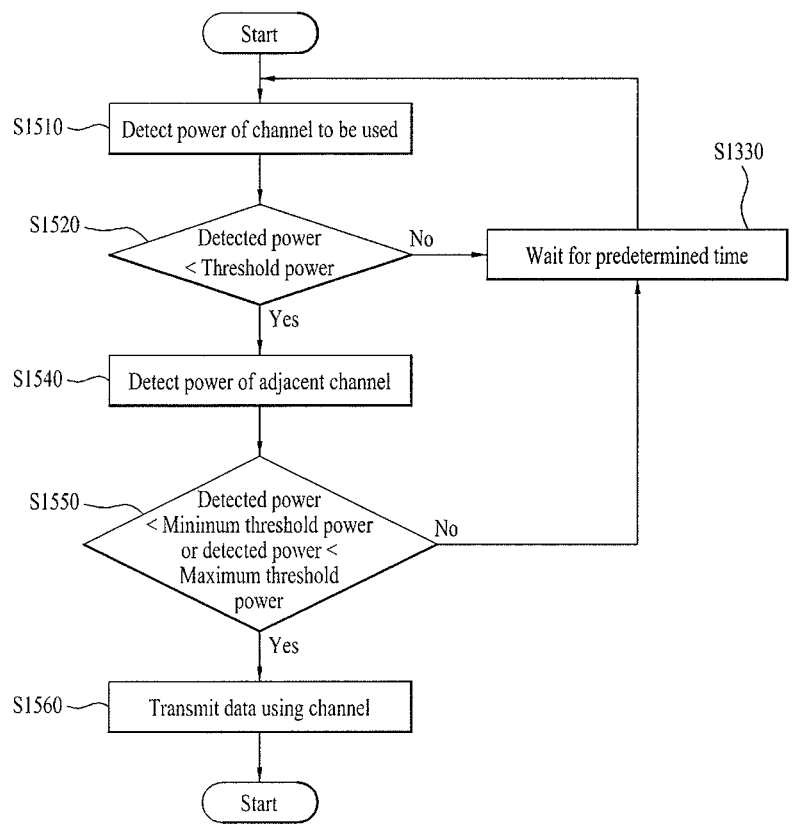
FIG. 15 is a flowchart illustrating a method of transmitting data using power detection in a transmitter according to a first embodiment disclosed in the present specification.

FIG. 15 is a flowchart illustrating a method of transmitting data using power detection at a transmitter according to a first embodiment disclosed in the present specification.

Referring to FIG. 15, the transmitter detects power of a channel to be used (S1510).

The transmitter may detect power of a channel to be used to transmit data to a receiver.

The transmitter may be one of a BS, an access point (AP) or a UE capable of performing data transmission and reception in a wireless communication system. The channel may be an arbitrary channel belonging to a frequency bandwidth used by the transmitter. For example, if the transmitter is a UE which utilizes an LTE system, the channel may be a channel using a frequency bandwidth (e.g., bandwidth of 1.8 GHz or 2.1 GHz) used in the LTE system.

Next, the transmitter compares the detected power with threshold power (S1520).

The transmitter may compare the detected power of the channel with the threshold power and determine whether the channel is occupied by another transceiver.

The threshold power is an arbitrary value for determining whether the channel is occupied by another transceiver. The threshold power is predetermined and may be stored in a memory of the transmitter.

As a result of comparison, if the detected power is equal to or greater than the threshold power, the transmitter waits for a predetermined time (S1530).

The transmitter may determine that the communication channel is occupied by another transceiver if the detected power is equal to or greater than the threshold power. Then, the transmitter may wait for a predetermined time (back-off time). In addition, the transmitter may re-detect the power of the channel after the predetermined time has elapsed.

If the detected power is less than the threshold power, the transmitter detects power of an adjacent channel (S1540).

The transmitter may determine that the communication channel is not occupied by another transmitter if the detected power is less than the threshold power. That is, the transmitter may determine that the channel may be occupied by the transmitter, because the channel is empty.

In this case, the transmitter may detect the power of the adjacent channel of the channel. The adjacent channel has a frequency adjacent to the frequency of the channel and may be used by other transceivers adjacent to the transmitter. The adjacent channel may be used by other transceivers using a system different from that of the transmitter according to a frequency use policy. For example, if the transmitter is a UE which utilizes an LTE system, the channel is used in the LTE system and, if the transmitter is a UE which does not use the LTE system, the channel may support wireless communication systems other than LTE.

Next, the transmitter compares the detected power of the adjacent channel with minimum threshold power and maximum threshold power (S1550).

The transmitter compares the detected power of the adjacent channel with the minimum threshold power and the maximum threshold power of the adjacent channel.

The minimum threshold power may be an arbitrary value for determining whether the adjacent channel is occupied by the other transceivers using the adjacent channel. The minimum threshold power is predetermined and may be stored in a memory of the transmitter. The minimum threshold power is used to determine whether the channel is occupied and thus may be equal to the threshold power of the channel.

If the power of the adjacent channel is less than the minimum threshold power, it may be determined that the adjacent channel is not occupied by the other transceivers. In contrast, if the power of the adjacent channel is equal to or greater than the minimum threshold power, it may be determined that the adjacent channel is occupied by the other transceivers to transmit or receive data.

The maximum threshold power may be an arbitrary value for determining whether the adjacent channel is used by the other transceivers using the adjacent channel to transmit or receive data.

In general, in the power of the channel, transmit power is higher than receiver power. Accordingly, if the detected power of the channel is equal to or greater than an arbitrary value, it may be determined that the channel is being used for transmission and, if the detected power of the channel is less than an arbitrary value, it may be determined that the channel is being used for reception.

The maximum threshold power is a criterion for such determination. It may be determined that the adjacent channel is occupied by the other transceivers and is used to transmit data if the power of the adjacent channel is equal to or greater than the maximum threshold power and it may be determined that the adjacent channel is occupied by the other transceivers and is used to receive data if the power of the adjacent channel is less than the maximum threshold power.

The maximum threshold power may be predetermined in consideration of the propagation characteristics of the channel and radio data in order to set a boundary between data transmission and reception. In addition, the maximum threshold power may be greater than the minimum threshold power because the adjacent channel is occupied by the other transceivers.

As a result of comparison, if the power of the adjacent channel is equal to or greater than the minimum threshold power and is equal to or less than the maximum threshold power, the transmitter waits for a predetermined time (S1530).

If the power of the adjacent channel is equal to or greater than the minimum threshold power, the transmitter may determine that the adjacent channel is occupied by the other transceivers. In particular, if the power of the adjacent channel is equal to or less than the maximum threshold power, the transmitter may determine that the adjacent channel is occupied by the other transceivers and the other transceivers receive data.

If the transmitter transmits data via the channel when the other transceivers receive data using the adjacent channel, transmit power of data transmission may cause unnecessary radiation to the adjacent channel. That is, the transmit power leaks to the adjacent channel to interrupt reception of the other transceivers using the adjacent channel. In this case, the transmitter should not transmit data for channel efficiency.

Accordingly, the transmitter may wait for a predetermined time and re-detect the power of the channel after the predetermined time has elapsed, if the power of the adjacent channel is equal to or greater than the minimum threshold power and is equal to or less than the maximum threshold power.

In contrast, if the power of the adjacent channel is less than the minimum threshold power or is greater than the maximum threshold power, the transmitter transmits data using the channel (S1560).

If the power of the adjacent channel is less than the minimum threshold power, the transmitter may determine that the adjacent channel is not occupied by the other transceivers. Accordingly, even when the transmitter transmits data using the channel, unnecessary radiation to the adjacent channel is not caused.

If the power of the adjacent channel is greater than the maximum threshold power, the transmitter may determine that the adjacent channel is occupied by the other transceivers and the other transceivers transmit data. In this case, if the transmitter transmits data using the channel, unnecessary radiation to the adjacent channel may be caused. However, since transmission is being performed using the adjacent channel, in comparison between relative signal levels, the transmit power of the adjacent channel is not weaker than the transmit power of the channel, influence due to interference may be ignored and data transmission efficiency does not deteriorate due to unnecessary radiation.

Accordingly, as a result of comparison, if the power of the adjacent channel is less than the minimum threshold power or greater than the maximum threshold power, the transmitter may transmit data using the channel.

FIG. 16 is a diagram showing data transmission using power detection of an adjacent channel in a transmitter according to a first embodiment disclosed in the present specification.

Figure 16A:
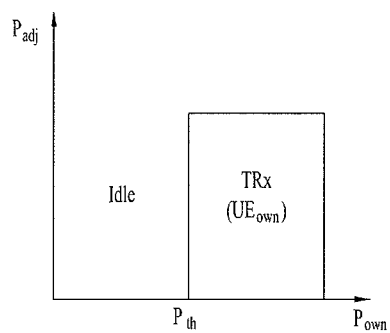
FIG. 16a is a diagram showing data transmission using power detection of an adjacent channel in a transmitter according to a first embodiment disclosed in the present specification.

Referring to FIG. 16a, if the detected power $P_{own}$ of the channel is less than the threshold power $P_{th}$, the channel may not be occupied, that is, may be in the idle state. That is, the channel may not be occupied by any transceiver. Accordingly, when only the power of the channel is considered, the transmitter may transmit data using the channel.

If the detected power $P_{own}$ of the channel is equal to or greater than the threshold power $P_{th}$, the channel may be occupied by the transceiver $UE_{own}$ capable of using the channel. At this time, the transceiver $UE_{own}$ capable of using the channel may transmit or receive TRX data using the channel. Accordingly, the transmitter may not transmit data using the channel regardless of the power of the channel.

Figure 16B:
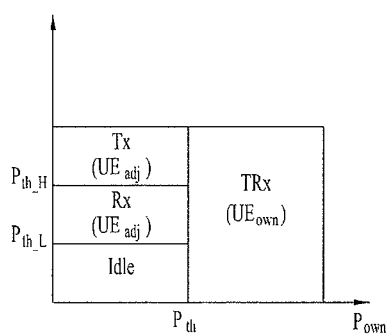
FIG. 16b is a diagram showing data transmission using power detection of an adjacent channel in a transmitter according to a first embodiment disclosed in the present specification.

Referring to FIG. 16b, if the detected power $P_{own}$ of the channel is equal to or greater than the threshold power $P_{th}$, since the transmitter may not use the channel, the power of the adjacent channel may be considered only when the detected power $P_{own}$ of the channel is less than the threshold power $P_{th}$.

If the power $P_{adj}$ of the adjacent channel is less than the minimum threshold power $P_{th\_L}$, the adjacent channel may not be occupied by another transceiver $UE_{adj}$ using the adjacent channel. That is, since the adjacent channel is not occupied by any transceiver (idle state), unnecessary radiation to the adjacent channel is not problematic. Accordingly, when both the power $P_{own}$ of the channel and the power $P_{adj}$ of the adjacent channel are considered, the transmitter may transmit data using the channel.

If the power $P_{adj}$ of the adjacent channel is equal to or greater than the minimum threshold power $P_{th\_L}$ and is equal to or less than the maximum threshold power $P_{th\_H}$, the adjacent channel may be occupied by the transceiver $UE_{adj}$ using the adjacent channel and data is being received (Rx).

In this case, if the transmitter transmits data via the channel, unnecessary radiation to the adjacent channel causes interference with the received signal of another transceiver $UE_{adj}$. Accordingly, even when the channel is not occupied (idle state), the transmitter may transmit data using the channel in consideration of the power $P_{adj}$ of the adjacent channel.

If the power $P_{adj}$ of the adjacent channel is greater than the maximum threshold power $P_{th\_H}$, the adjacent channel is occupied by the transceiver $UE_{adj}$ using the adjacent channel and data is being transmitted (Tx). In this case, if the transmitter transmits data using the channel, unnecessary radiation to the adjacent channel may be caused. However, since data is being transmitted using the adjacent channel, in comparison between relative signal levels, the power $P_{adj}$ of the adjacent channel is not weaker than the power $P_{own}$ of the channel, influence due to interference may be ignored and data transmission efficiency does not deteriorate due to unnecessary radiation.

Accordingly, the transmitter may transmit data using the channel in consideration of the power $P_{adj}$ of the adjacent channel.

Second Embodiment

In a second embodiment disclosed in the present specification, the case in which the transmitter receives data using power detection of the adjacent channel, via which data is being received, will be described.

Figure 17:
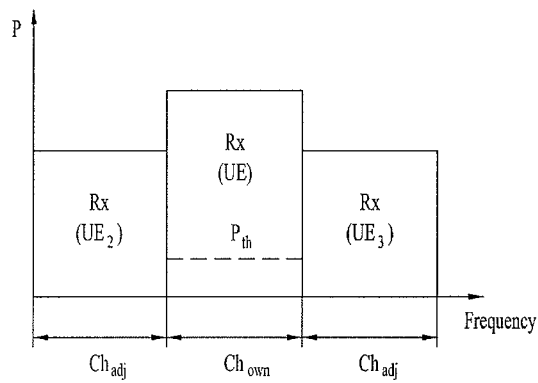
FIG. 17 is a diagram showing data transmission using power detection of an adjacent channel in a transmitter according to a second embodiment disclosed in the present specification.

FIG. 17 is a diagram showing data transmission using power detection of an adjacent channel in a transmitter according to a second embodiment disclosed in the present specification.

Referring to FIG. 17, the transmitter (UE) may receive data using the channel $Ch_{own}$ (at this time, the transmitter may receive data using a general communication terminal) and, at the same time, other UEs UE2 and UE3 may receive (Rx) data using the adjacent channel $Ch_{adj}$.

In this case, since the receive power of the channel $Ch_{own}$ is not so high as unnecessary radiation to the adjacent channel $Ch_{adj}$ is caused, interference is not caused due to unnecessary radiation.

Accordingly, the transmitter (UE) may receive data using the channel $Ch_{own}$ as the result of detecting the power of the channel $Ch_{own}$ and the power of the adjacent channel $Ch_{adj}$.

Third Embodiment

In a third embodiment disclosed in the present specification, the case in which the transmitter transmits data using power detection of the adjacent channel, via which data is being transmitted, will be described.

Figure 18:
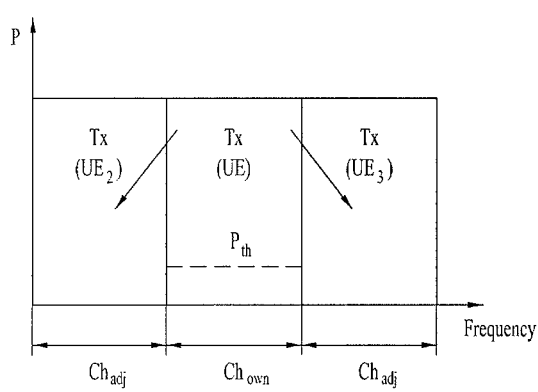
FIG. 18 is a diagram showing data transmission using power detection of an adjacent channel in a transmitter according to a third embodiment disclosed in the present specification.

FIG. 18 is a diagram showing data transmission using power detection of an adjacent channel in a transmitter according to a third embodiment disclosed in the present specification.

Referring to FIG. 18, the transmitter (UE) may transmit data using the channel $Ch_{own}$ and, at the same time, other UEs UE2 and UE3 may transmit (Tx) data using the adjacent channel $Ch_{adj}$.

In this case, the receive power of the channel $Ch_{own}$ may cause unnecessary radiation to the adjacent channel $Ch_{adj}$. However, since the transmit power of the adjacent channel $Ch_{adj}$, via which data is being transmitted, is as high as the power of the channel $Ch_{own}$, when relative signal levels are considered, performance may not deteriorate due to unnecessary radiation Accordingly, the transmitter (UE) may transmit data using the channel $Ch_{own}$ as the result of detecting the power of the channel $Ch_{own}$ and the power of the adjacent channel $Ch_{adj}$.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A method of transmitting data at a transmitter using power detection of an adjacent channel, the method comprising:
    detecting power of a selected channel;
    determining an occupancy state of the selected channel by comparing the detected power with threshold power;
    detecting power of the adjacent channel of the selected channel if it is determined that the selected channel is not occupied;
    determining the state of the adjacent channel by comparing the detected power of the adjacent channel with minimum threshold power and maximum threshold power; and
    transmitting the data using the selected channel based on the determined adjacent channel state result,
    wherein the selected channel and/or the adjacent channel is a frequency bandwidth used in a long term evolution (LTE) system, and
    wherein the determining the state of the adjacent channel includes:
        determining that data is being received using the adjacent channel data if the power of the adjacent channel is equal to or greater than the minimum threshold power and is equal to or less than the maximum threshold power;
        determining that data is being transmitted using the adjacent channel if the power of the adjacent channel is greater than the maximum threshold power; and
        determining that the adjacent channel is not occupied if the power of the adjacent channel is less than the minimum threshold power.

2. The method according to claim 1, wherein the determining the occupancy state of the selected channel comprises:
    determining that the selected channel is not occupied if the detected power is less than the threshold power; and
    determining that the selected channel is occupied by another transceiver if the detected power is equal or greater than the threshold power.

3. The method according to claim 2, wherein the determining the occupancy state of the selected channel comprises:

waiting for a predetermined time if it is determined that the selected channel is occupied; and re-detecting the power of the selected channel after the predetermined time has elapsed.

4. The method according to claim 1, wherein the transmitting the data comprises:

waiting for a predetermined time if it is determined that data is being received using the adjacent channel; and re-detecting the power of the selected channel after the predetermined time has elapsed.

5. The method according to claim 1, wherein the transmitting the data comprises transmitting the data using the selected channel if data is being transmitted using the adjacent channel or if the adjacent channel is not occupied, as the result of comparison.

6. A transmitter for transmitting data using power detection of an adjacent channel, the transmitter comprising:

a wireless communication unit configured to transmit and receive a radio frequency (RF) signal; and a processor for controlling the wireless communication unit and transmitting data, wherein the processor is configured to:

detect power of a selected channel; to determine an occupancy state of the selected channel by comparing the detected power with threshold power, detect power of the adjacent channel of the selected channel if it is determined that the selected channel is not occupied, determine the state of the adjacent channel by comparing the detected power of the adjacent channel with minimum threshold power and maximum threshold power, transmit data using the selected channel based on the determined adjacent channel state result, determine that data is being received using the adjacent channel if the power of the adjacent channel is equal to or greater than the minimum threshold power and is equal to or less than the maximum threshold power, determine that data is being transmitted using the adjacent channel if the power of the adjacent channel is greater than the maximum threshold power, and determine that the adjacent channel is not occupied if the power of the adjacent channel is less than the minimum threshold power, and wherein the selected channel and/or the adjacent channel is a frequency bandwidth used in an LTE system.

7. The transmitter according to claim 6, wherein the processor is configured to determine that the selected channel is not occupied if the detected power is less than the threshold power, and to determine that the selected channel is occupied by another transceiver if the detected power is equal or greater than the threshold power.

8. The transmitter according to claim 7, wherein the processor is configured to wait for a predetermined time if it is determined that the selected channel is occupied, and to re-detect the power of the selected channel after the predetermined time has elapsed.

9. The transmitter according to claim 6, wherein the processor is configured to wait for a predetermined time if it is determined that data is being received using the adjacent channel, and to re-detect the power of the selected channel after the predetermined time has elapsed.

10. The transmitter according to claim 6, wherein the processor is configured to transmit the data using the selected channel if data is being transmitted using the adjacent channel or if the adjacent channel is not occupied, as the result of comparison.

* * * * *